United States Patent [19]

Fraige

[11] Patent Number: 4,496,623
[45] Date of Patent: Jan. 29, 1985

[54] BUOYANT FIBER PRODUCT

[76] Inventor: Richard Fraige, 11005 Hwy. 50 E., Carson City, Nev. 89701

[21] Appl. No.: 524,871

[22] Filed: Aug. 22, 1983

Related U.S. Application Data

[62] Division of Ser. No. 337,122, Jan. 5, 1982.

[51] Int. Cl.³ .............................................. B32B 5/16
[52] U.S. Cl. ...................................... 428/283; 5/450; 428/327
[58] Field of Search ...................... 428/240, 283, 304.4, 428/311.1, 311.5, 313.5, 314.4, 314.8, 316.6, 317.9, 318.4, 323, 327; 264/45.3, 46.3, 46.2; 5/450, 451

[56] References Cited

U.S. PATENT DOCUMENTS

| | | | |
|---|---|---|---|
| 3,025,202 | 3/1962 | Morgan et al. | 264/45.3 |
| 3,037,897 | 6/1962 | Pelley | 264/46.2 |
| 3,050,427 | 8/1962 | Slayter et al. | 264/45.3 |
| 4,301,560 | 11/1981 | Fraige | 5/450 |
| 4,357,386 | 11/1982 | Luciano et al. | 428/283 |
| 4,362,778 | 12/1982 | Andersson et al. | 428/304.4 |
| 4,411,033 | 10/1983 | Morgan | 5/450 |

Primary Examiner—William J. Van Balen
Attorney, Agent, or Firm—Romney, Golant, Martin & Ashen

[57] ABSTRACT

The fiber product includes a large multiplicity of fibers bound together with a binder. The binder also secures a quantity of buoyant particles, such as expanded foam beads, to the fibers. The buoyant particles render the product as a whole buoyant.

The fiber product is manufactured by adding an adhesive and buoyant particles to a quantity of garnetted fibrous material, and curing the adhesive to bind the fibers and particles together.

24 Claims, 3 Drawing Figures

4,496,623

BUOYANT FIBER PRODUCT

RELATED APPLICATIONS

This is a divisional of my application Ser. No. 337,122, filed Jan. 5, 1982.

BACKGROUND OF THE INVENTION

1. Field of the Invention

This invention relates generally to fibrous products, and more particularly to a bonded buoyant fiber product.

2. Prior Art

Polyester fiber has many applications, including use in waterbed mattresses for the purpose of inhibiting wave motion. As set forth in my U.S. Pat. No. 4,301,560 entitled "Waterbed Mattress", which issued Nov. 24, 1981, and which is hereby incorporated by reference, bonded nonwoven polyester fiber disposed within a waterbed mattress very effectively reduces undesirable wave motion.

The most undesirable wave motion occurs near the upper surface of the mattress. This portion of the wave motion can be inhibited by positioning the fiber in the upper part of the mattress. This can be accomplished by filling substantially all of the mattress with the fiber. The fiber, which is nonbuoyant, rests on the bottom, inner surface of the mattress and extends upward into the upper portion of the mattress.

Although wave motion can be effectively reduced in the manner described above, the necessity of filling substantially all of the mattress with the fiber is a serious drawback. The large required amount of fiber increases the shipping weight of the mattress and, more importantly, significantly increases the cost of manufacturing the mattress.

One solution to the above problem is to render the bonded fiber buoyant in some manner. The term buoyant as used herein means buoyant in water. One prior art appraoch is to construct a laminated fiber pad comprised of an upper layer of fiber, a middle layer of buoyant foam material and a lower layer of fiber. The buoyant foam material can be either a thin foam pad or a thin layer of foam beads. The laminated pad is held together by suitable adhesives, stiching, riviting and other similar methods.

The prior art buoyant laminated pads are effective in suppressing wave motion. However, such pads are relatively expensive to manufacture because of the large amount of manual labor required in the manufacture.

Another prior art attempt to produce a buoyant fiber product involves the use of polypropolene fiber. This fiber, unlike polyester fiber, is buoyant in water. However, if a commonly used bonding agent, such as acrylic latex, is used the fiber is rendered non-buoyant. Experiments have been conducted with buoyant bonding agents. However, it is not believed that any of such experiments have been met with success.

The present invention overcomes the above-described shortcomings. A novel buoyant fiber product is disclosed which may be used effectively to reduce wave motion in a waterbed mattress. Conventional automated assembly lines for producing non-buoyant bonded fiber can be readily and easily adapted to manufacture the subject fiber product. Essentially no manual labor is required; therefore, the cost of manufacturing the buoyant fiber does not greatly exceed that of bonded non-buoyant fiber. These and other advantages of the subject invention will become apparent after reading the following detailed description of the invention together with the drawings.

SUMMARY OF THE INVENTION

A buoyant fiber product and method of manufacturing same is disclosed. The fiber product is comprised of a multiplicity of fibers together with a multiplicity of buoyant particles. A binder is disposed over the fibers such that substantially each of the fibers are bound to at least one other fiber. The same binder is disposed over the buoyant particles such that substantially each of the particles is bound to at least one of the fibers. The buoyant particles are present in sufficient quantity to render the fiber product buoyant.

The buoyant fiber product is manufactured by adding an adhesive, such as acrylic latex, to a quantity of fibrous material which may be comprised of polyester fibers. A quantity of particles, such as foam beads, are also added to the fibrous material. The particles are buoyant when added to the fibrous material or upon or after application of heat.

DETAILED DESCRIPTION OF THE INVENTION

Figure 1:
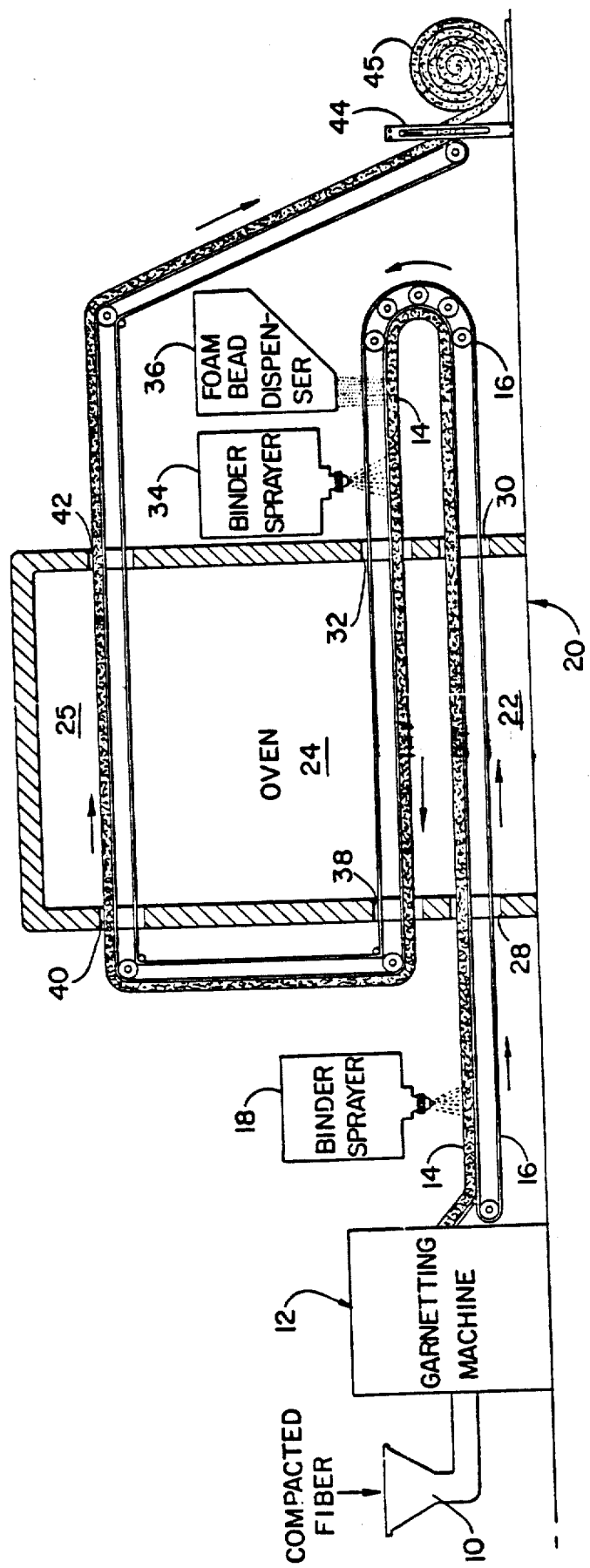
FIG. 1 is a simplified schematic representation of the presently preferred method of manufacturing the subject fiber product.

As FIG. 1 shows, a preferred method of manufacture begins with loading unbonded fiber into the hopper 10 of a conventional garnetting machine, sometimes called a "garnett", 12. Polyester is preferable, but other fibers may be acceptable. For handling ease, the fiber should be in staple form rather than continuous, and individual fiber lengths should be about two to three inches. A fiber of forty to forty-five denier (weight per unit length) is acceptable for waterbeds; however, a mix of seventy-five percent fiber of forty denier and twenty-five percent fiber of fifteen denier is better for this use.

The garnett 12 has a series of grooved rollers which shred, tear and comb the compacted fiber to form a continuous stream 14 of lofted fiber of relatively uniform density, thickness and width. The garnett 12 is set to make a fiber stream about two inches thick. The weight of the two-inch-thick lofted fiber is preferably on the order of one and one-half ounces per square foot–or, in other words, the density of the lofted fiber is on the order of nine ounces per cubic foot. The width of the fiber stream depends on the size of the mattress in which the final product will be used. A typical width is sixty inches.

The fiber stream 14 leaves the garnett and is delivered to a conveyor chain 16, which carries it to a conventional binder sprayer 18. The sprayer 18 typically reciprocates across the width of the fiber stream 14 to uniformly coat the upper portion of the fiber with the binder which is in liquid form. This uncured or partially cured binder is sometimes referred to herein as an adhesive. The liquid binder will trickle down through the fiber stream 14 and coat a large portion of the individual fibers.

The binder is preferably a self-crossing linking acrylic emulsion such as the binder marketed by Union Carbide of New York, New York under the trademark "UCAR LATEX 879." The Rohm and Haas Company of Philadelphia, Pennsylvania also markets a suitable binder under the trademark "Rhoplex TR-407." The binder should be diluted with a water solvent, as recommended by the manufacturer, to permit spraying. Binders utilizing non-aqueous solvents are not preferred.

The fiber carrying the uncured (or partially cured) binder is then transported to a conventional drying and curing oven, generally designated by the numeral 20. The fiber makes three passes through the oven on conveyer chain 16. The heat of the oven causes the water solvent of the binder to evaporate and further causes the binder to cure. The oven is approximately thirty feet in length with the lineal speed of the conveyer chain 16 being approximately thirty feet per minute. Accordingly, the drying and curing time in the oven is roughly one minute per pass or a total of three minutes.

Oven 20 is provided with three thermostats which are used for independently controlling the oven temperature in the three areas 22, 24 and 26 adjacent the conveyer chain 16. Optimum results have been achieved by maintaining the oven temperature in the three areas at approximately 225° F. Typical curing temperatures for conventional bonded non-buoyant fiber is somewhat higher, i.e., on the order of 275° F.

Conveyer chain 16 first enters oven 12 through entrance 28 and exits through exit 30. During this first pass through the oven, the binder applied by sprayer 18 is partially dried and cured. Conveyer 16 loops around and re-enters the oven at entrance 32. A second binder sprayer 34, similar to sprayer 18, sprays additional binder through conveyer chain 16 and onto the opposite side of the fiber stream 14. The second application of binder, which trickles down through the fiber stream, ensures that substantially all of the fibers are at least partially coated with binder.

Prior to the second application of binder, unexpanded foam beads are dispensed over the fiber stream 14 by dispenser 36. Unexpanded polystyrene foam beads which expand up to approximately 1/16 inch in diameter upon application of heat are preferred. It is also preferable that the foam beads contain some form of fire retardent. As the term is used herein, an unexpanded foam bead is a bead which expands to at least triple its unexpanded diameter upon or after application of heat. Unexpanded foam beads manufactured by BASF Wyanndott Corporation of Wyanndott, Michigan under the trademark "STYROPOR" have been found suitable. Another supplier of unexpanded foam beads is ARCO Polymers of Los Angeles, California.

Dispenser 36 dispenses the foam beads evenly over the surface of the fiber stream at a predetermined rate. Ordinary garden variety fertilizer spreaders have been found suitable for this purpose. A single spreader is capable of dispensing beads over a twenty inch path. In order to cover the entire sixty inch width of the fiber stream 14, three spreaders are positioned adjacent one another over the conveyer chain 16. The spreaders are each driven by a common gear drive with a gear ratio selected to achieve the desired rate of bead delivery. Additional spreaders can be added to the bead dispenser in order to accommodate fiber streams having widths greater than sixty inches. It is preferable that dispenser 36 include an on/off mechanism. Thus, if conventional non-buoyant bond fiber is desired, the assembly line can be switched over by simply shutting down dispenser 36. A slight increase in oven temperature may be required.

The small diameter unexpanded foam beads have a tendency to drift down into the interior of the fiber stream 14 due to gravity. The uncured binder sprayed by sprayer 34 also tends to drive the beads down into the fiber. Substantially all of the foam beads are at least partially covered with the liquid binder.

The fiber stream 14 reenters the oven at entry 32. The heat of the oven then begins to dry and cure the newly added binder and further dries and cures the original binder. In addition, the heat causes the foam beads to expand. The stream 14 then exits the oven through opening 38 and returns to the oven through opening 40. The final binder curing takes place during this third and final pass through the oven. In addition, the foam beads become fully expanded during this final pass if they have not already done so.

The fiber stream 14 exits oven 20 through opening 42 and is carried to ground level by the conveyer chain 16. A cutting device 44 cuts the fiber stream into convenient lengths which are wound into rolls 45 for shipping.

The cured binder causes substantially all of the fibers to be bonded to at least one other fiber. The same binder causes substantially all of the foam beads to be bonded to at least one of the fibers. Thus, an integral buoyant fiber product is produced.

It is important to note that the oven curing temperature and time are critical. If the oven temperature is too low or the oven time is too short, the binder will not become fully cured. On the other hand, if the oven temperature is too high or the time is too long, the polystyrene beads will fully expand and then contract to an unsuitably small diameter. It should also be noted that the time and temperature values previously set forth may have to be adjusted to ensure complete curing while maintaining acceptably large bead diameters.

It is preferable to dispense the beads over the fiber stream immediately prior to the final binder spraying. As previously stated, the force of the sprayed binder encourages the unexpanded beads towards the center of the fiber stream. Also, the sprayed binder coats the beads and secures the beads to the fiber upon curing. In any event, the beads should be introduced at some point prior to the curing of the binder so that the liquid binder will cause substantially all of the beads to adhere to at least one of the fibers.

Figure 2:
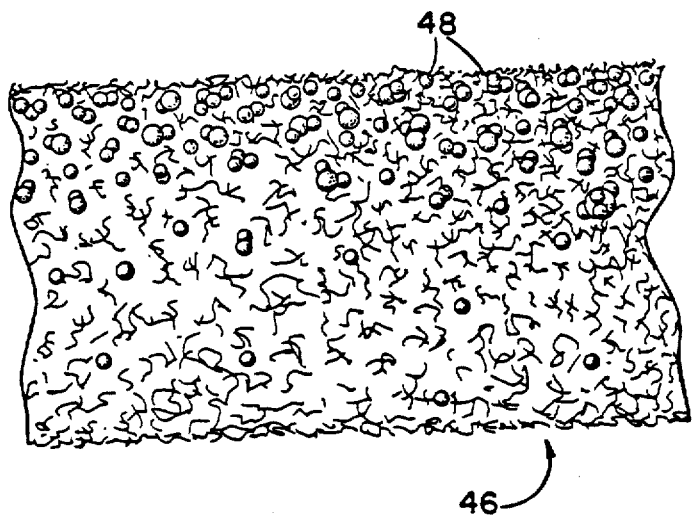
FIG. 2 shows a representative cross-section of a sample of the subject fiber product.

FIG. 2 shows a cross-section of a sample of the final buoyant fiber product, generally indicated by the numeral 46. Each of the fiber strands is bonded to at least one other fiber by the binder at one or more points to form an integral unit. The expanded foam beads 48 are dispersed throughout the product with the greater concentration being near the top surface, which was the surface closest to bead dispenser 36. The beads are secured in place by the same binder which binds the individual fibers together. The bead dispenser 36 (FIG. 1) is preferably driven at a rate such that there are an average of approximately fifteen to fifty expanded beads per cubic inch of fiber (unexpanded or partially expanded beads are not counted). An expanded bead is a bead which has a diameter which is at least three times as great as the original unexpanded diameter. The number of foam beads required to render the final product buoyant may have to be adjusted to compensate for variations in bead diameter and in the weight of the fiber and binder.

Figure 3:
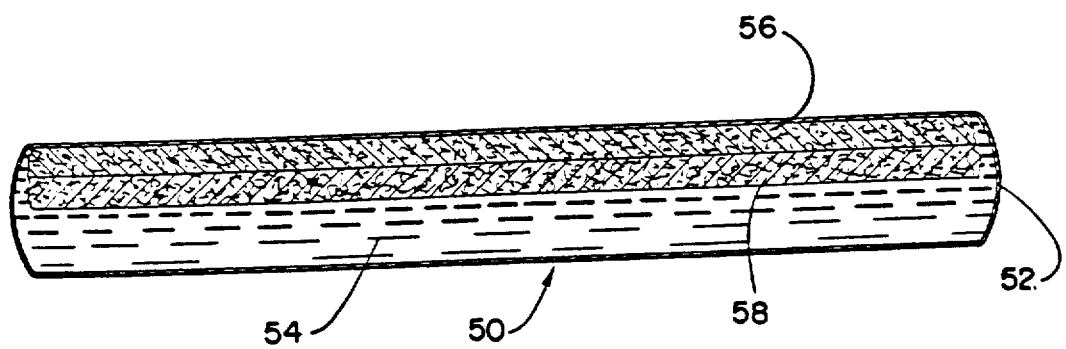
FIG. 3 is an elevated cross-sectional side view of a waterbed mattress with the subject fiber product installed for the purpose of suppressing wave motion.

Referring now to FIG. 3, a cross-section of a waterbed mattress, generally designated by the numeral 50, may be seen. The mattress is comprised of a suitably shaped flexible outer envelope 52, made of polyvinyl or the like, which is typically 9 inches deep, 72 inches wide, and 84 inches in length. The envelope 52 is substantially filled with water 54.

Disposed within envelope 52 are two pads 56 and 58 which are comprised of the subject buoyant fiber product. Each pad is 2 inches thick, 72 inches wide and 84 inches in length. Pads 56 and 58 are perferably laminated together using a suitable adhesive or by stitching or the like. The pads are each aligned with the surface having the greater bead concentration at the top.

The buoyant pads 56 and 58 float within the envelope 52 adjacent the upper surface thereof. Thus, the meshlike structure formed by the polyester fibers will greatly dampen wave motion in the area adjacent the occupant without the necessity of filling substantially the entire envelope 52 with costly fiber. There will also be a tendency to inhibit the formation of wave action. It is perferred that the two pads be only slightly buoyant, especially the lower pad 58. If pad 58 is highly buoyant, it will have a tendency to compress the upper pad 56 thereby reducing the loft of the pad and reducing the wave motion suppressing qualities.

It is important to note that, unlike prior art buoyant pads utilizing a sheet of foam material, the spaced-apart foam beads of the subject buoyant fiber product permit convection currents to pass through the pad. Accordingly, the pads will be thermally transparent so that the area adjacent the occupant will be uniformly and efficiently heated if a heating unit is being used.

Thus, a novel buoyant fiber product has been disclosed. This product can be easily manufactured using existing bonded fiber processing equipment with very minor modifications. The modified processing equipment can be readily converted between non-buoyant fiber and buoyant fiber by simply activating and deactivating the foam bead dispenser 36 (FIG. 1).

Although a perferred embodiment of the subject fiber product and method of manufacturing same has been disclosed, it will be apparent to those familiar with the art that modifications can be made without departing from the scope of the invention as defined by the appended claims. For example, fibers other than polyester may be found to be satisfactory provided the required wave motion suppression properties are present. It is perferable that the fibers be either non-woven or loosely woven and have a high loft. In addition, buoyant particles other than foam beads may be used, provided that such particles are compatible with the binder and retain significant buoyancy following the curing process, which may or may not take place at an elevated temperature. For waterbed applications, all components used should be resistant to degradation in water and resistent to chemicals commonly added to waterbed mattresses.

I claim:

1. A buoyant, readily water-permeable and therefore heat-convection-transparent, but wave-retarding fiber product for use in waterbeds to deter wave action; said product comprising:
   a large multiplicity of lofted fibers, in the form of a matting that is readily water-permeable throughout;
   a large multiplicity of buoyant particles spaced apart among the fibers to maintain the said readily water-permeable condition; and
   a binder disposed on said fibers and on said particles, said binder causing substantially each of said fibers to be bound to at least one other fiber, respectively, and substantially each of said particles to be bound to at least one of said fibers, respectively;
   said binder causing the material to be set in said lofted, readily water-permeable condition; whereby it is particularly adapted to float within and near the top of such waterbeds and to retard waves therein.

2. The fiber product of claim 1 wherein said fiber is polyester fiber.

3. The fiber product of claim 1 wherein said fiber is nonwoven.

4. The fiber product of claim 1 wherein the fiber is loosely woven.

5. The fiber product of claim 1 wherein the buoyant particles are foam beads.

6. The fiber product of claim 1 wherein the buoyant particles are polystyrene foam beads.

7. The fiber product of claim 1 wherein the binder comprises latex.

8. The fiber product of claim 1 wherein the binder comprises acrylic latex.

9. The fiber product of claim 1 wherein:
   the quantity of lofted fibers has a density on the order of nine ounces per cubic foot;
   the fibers are nonwoven or loosely woven polyester fibers;
   the buoyant particles are foam beads; and
   the binder comprises latex.

10. A buoyant, readily water-permeable and therefore heat-convection-transparent, but wave-retarding fiber product for use in waterbeds to deter wave action; said product comprising:
    a large multiplicity of lofted polyester fibers, in the form of a matting that is readily water-permeable throughout;
    a large multiplicity of buoyant foam particles spaced apart among the fibers to maintain the said readily water-permeable condition; and
    a binder comprising latex disposed on said fibers and on said foam particles, said binder causing substantially each of said fibers to be bound to at least one other fiber, respectively, and substantially each of said foam particles to be bound to at least one of said fibers, respectively;
    said binder causing the material to be set in said lofted, readily water-permeable condition; whereby it is particularly adapted to float within and near the top of such waterbeds and to retard waves therein.

11. A buoyant, readily water-permeable and therefore heat-convection-transparent, but wave-retarding pad for use inside a waterbed mattress and comprising:
    a quantity of lofted fibers, in the form of a matting that is readily water-permeable throughout, and sufficient to form a lofted shape having nearly the length and width of such a waterbed mattress;
    a quantity of buoyant particles that is generally dispersed throughout the quantity of fibers to maintain the said readily water-permeable condition and that is sufficient, in combination with the quantity of fibers and with the binder that is mentioned hereunder, to make such pad buoyant in water; and a binder disposed on the fibers and on the particles to hold such pad together;

said binder causing the material to be set in said lofted, readily water-permeable condition; whereby it is particularly adapted to float within and near the top of such waterbeds and to retard waves therein.

12. The product of claim 1 wherein:
the quantity of lofted fibers is in the form of garnetted fiber.

13. The product of claim 1 wherein:
the quantity of lofted fibers is in the form of shredded, torn and combed fiber.

14. The product of claim 10 wherein:
the quantity of lofted fibers is in the form of garnetted fiber.

15. The product of claim 10 wherein:
the quantity of lofted fibers is in the form of shredded, torn and combed fiber.

16. The product of claim 11 wherein:
the quantity of lofted fibers is in the form of garnetted fiber.

17. The product of claim 11 wherein:
the quantity of lofted fibers is in the form of shredded, torn and combed fibrous material.

18. The product of claim 1, wherein:
by virtue of the said readily water-permeable condition the product is effectively transparent to heat transfer through water in such a waterbed by means of water convection currents.

19. The product of claim 10, wherein:
by virtue of the said readily water-permeable condition the product is effectively transparent to heat transfer through water in such a waterbed by means of water convection currents.

20. The product of claim 11, wherein:
by virtue of the said readily water-permeable condition the product is effectively transparent to heat transfer through water in such a waterbed by means of water convection currents.

21. The product of claim 1, wherein:
the fibrous material is a laterally extended matting that has a laterally extended upper surface; and said particles are spaced into, and away from the upper surface of, the matting to form a nonhomogeneous distribution of the particles within the matting.

22. The product of claim 1, wherein:
the binder holds the particles in the said nonhomogeneous distribution within, and away from the upper surface of, the matting.

23. The product of claim 21, wherein:
the particles are forced into, and away from the upper surface of, the matting by causing a fluid to flow forcibly from above the upper surface of the matting downwardly toward and through the matting during manufacture of the product.

24. The product of claim 23, wherein:
the said fluid is a quantity of the said binder, before curing thereof.

* * * * *